April 26, 1955 — W. L. STAHL ET AL — 2,707,270
WAVEGUIDE VARIABLE ATTENUATOR
Filed June 29, 1949 — 2 Sheets-Sheet 1

WITNESSES:
Robert C. Baird
Nw. L. Groome

INVENTORS
William L. Stahl &
Clyde E. Vogeley, Jr.
BY F. E. Browder
ATTORNEY

April 26, 1955  W. L. STAHL ET AL  2,707,270
WAVEGUIDE VARIABLE ATTENUATOR
Filed June 29, 1949  2 Sheets-Sheet 2
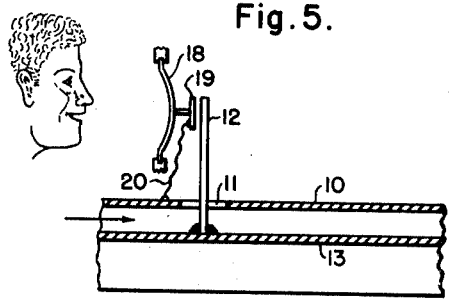
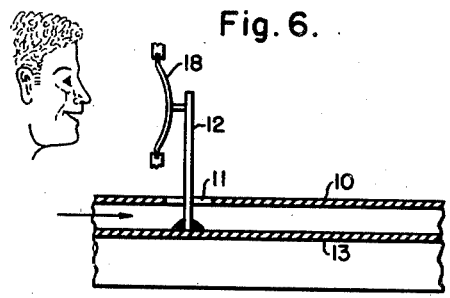
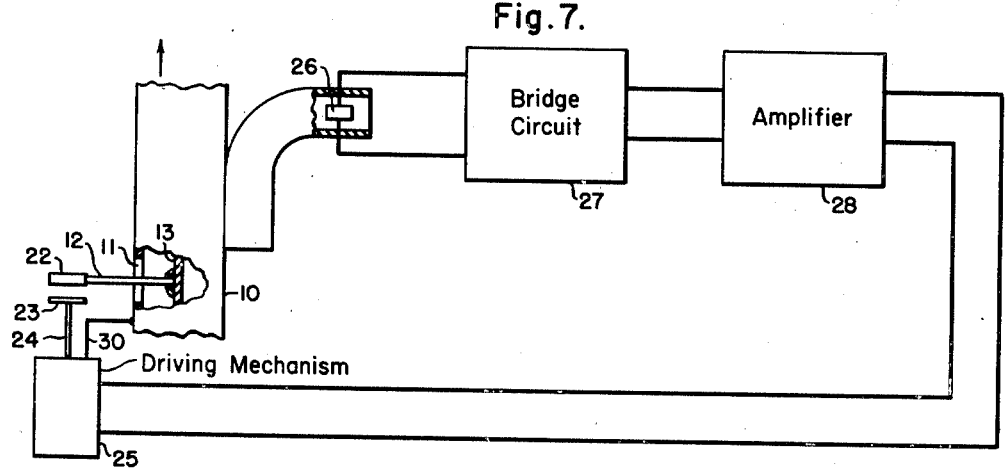
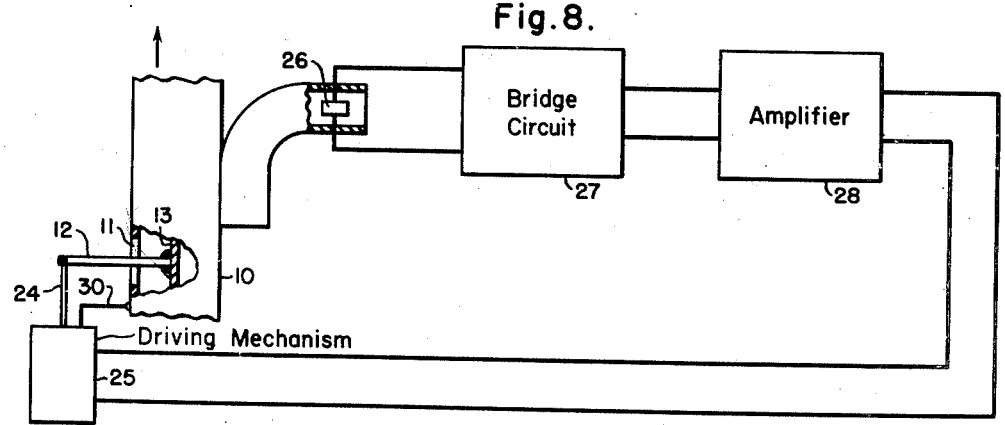
WITNESSES:
INVENTORS
William L. Stahl &
Clyde E. Vogeley, Jr.
BY
ATTORNEY

United States Patent Office 2,707,270
Patented Apr. 26, 1955

2,707,270

WAVEGUIDE VARIABLE ATTENUATOR

William L. Stahl, Chicago, Ill., and Clyde E. Vogeley, Jr., Pittsburgh, Pa., assignors to Westinghouse Electric Corporation, East Pittsburgh, Pa., a corporation of Pennsylvania Application June 29, 1949, Serial No. 101,946

19 Claims. (Cl. 333—81)

This invention relates to wave guides, and relates more particularly to devices for varying the levels of signals passing along wave guides.

Although ridged wave guides have many advantages such as reduced dimensions and weight, and broad band characteristics, over standard wave guides, their irregular geometry and high field concentrations in their center portions, have made it difficult to variably attenuate the power transmitted therethrough, the attenuating devices such as resistance cards which have been used with standard wave guides, being difficult to use with ridged wave guides. Likewise the prior devices such as rotating attenuators, and crystals placed across the guides, for modulating the signals passing therealong, have not operated successfully with ridged wave guides without difficulty.

This invention provides attenuating devices which, while particularly suited for use with ridged wave guides, can also be used with standard wave guides.

In one embodiment of the invention, a probe is inserted into a wave guide through an opening in its upper surface. The lower end of the probe is soldered to the bottom of the wave guide. A conductor grounded to the wave guide is spaced from the upper portion of the probe external the wave guide, and by varying the spacing of the conductor from the probe, the capacity between its upper portion and the probe is varied, and the power transmitted through the wave guide is varied. A signal passing along the wave guide can be modulated by vibrating the conductor as through its connection to the diaphragm of a microphone. The signal level can be maintained constant by adjusting the position of the conductor relative the probe, in accordance with changes in the signal level.

In another embodiment of the invention, a probe of spring metal is inserted into a wave guide through an opening in its upper surface, the lower end of the probe being soldered to the bottom of the guide. A conductor grounded to the guide, is connected to the upper end of the probe, and the position of the upper end of the probe is varied by adjustment of the position of the conductor. This causes deflection of the upper end of the probe and variation of the capacity between it and the wave guide, and consequent variation of the power transmitted along the guide. A signal passing along the guide can be modulated by vibrating the end of the probe. The signal level can be maintained constant by deflecting the upper end of the probe in accordance with the signal level changes.

An object of this invention is to improve devices for attenuating power transmitted along wave guides.

Another object of the invention is to improve devices for modulating signals passing along wave guides.

Another object of the invention is to improve devices for maintaining uniform signal levels in wave guides.

The invention will now be described with reference to the drawings, of which:

Fig. 5 is a diagrammatic view illustrating one embodiment of the invention used for modulating a signal passing along a wave guide;

Fig. 6 is a diagrammatic view illustrating another embodiment of the invention used for modulating a signal passing along a wave guide;

Fig. 7 is a diagrammatic view illustrating one embodiment of the invention used for maintaining a constant signal level in a wave guide, and Fig. 8 is a diagrammatic view illustrating another embodiment of the invention used for maintaining a constant signal level in a wave guide.

Figure 1:
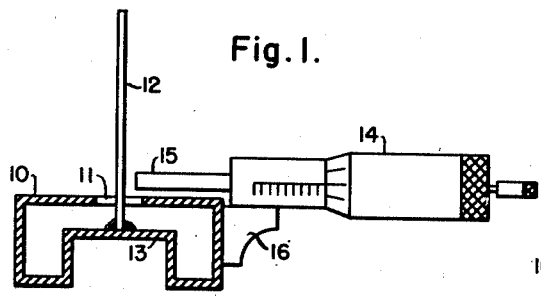
Fig. 1 is a side elevation of one embodiment of the invention applied to a ridged wave guide, the guide being shown in cross-section.
Figure 2:
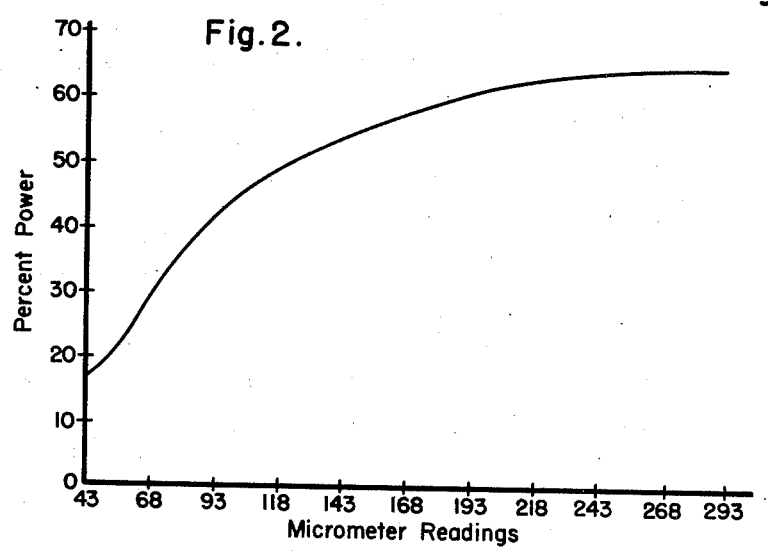
Fig. 2 is a graph illustrating the characteristics of the device of Fig. 1.

Referring now to Fig. 1, the ridged wave guide 10 has a circular opening 11 in its upper wall. The probe 12 which has its lower end soldered to the inwardly extending portion 13 of the guide, extends upwardly through the center of the opening 11 with its upper end above the guide. The micrometer 14 is attached by the member 16 to the guide so that its shaft 15 extends with its axis perpendicular to the axis of the probe. As the micrometer head is rotated to move the outer end of its shaft nearer the probe, the capacity between the probe and the shaft is increased. Since the shaft is electrically as well as structurally connected to the wave guide, the capacity between the probe and the wave guide is increased when the outer end of the shaft is moved nearer the probe. This causes the power in the wave guide beyond the probe to decrease. Fig. 2 illustrates how the power decreases as the distance between the end of the micrometer shaft and the probe is decreased.

Figure 3:
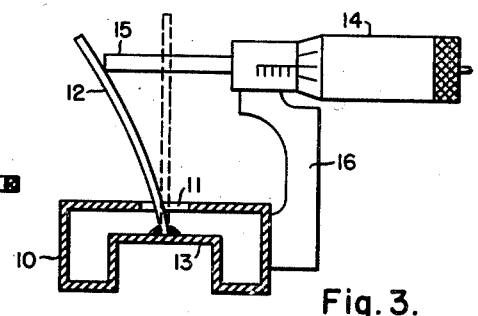
Fig. 3 is a side elevation of another embodiment of the invention applied to a ridged wave guide shown in cross-section.
Figure 4:
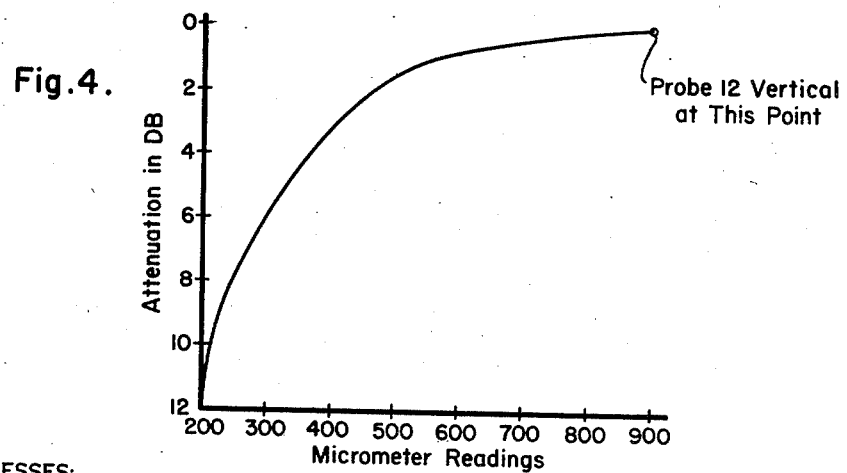
Fig. 4 is a graph illustrating the characteristics of the device of Fig. 3.

In the embodiment of the invention illustrated by Fig. 3 of the drawing, the probe 12 is of flexible spring metal, has its lower end soldered to the inwardly extending portion 13 of the guide 10, and normally extends upwardly through the center of the opening 11 in the top of the guide. The micrometer shaft 15 has its outer end in contact with the probe, and as the micrometer head is rotated for decreasing the power in the guide, the probe has its upper end deflected by the micrometer shaft towards an edge of the opening 11 thereby increasing the capacity between the probe and the wave guide. Fig. 4 illustrates the power attenuation resulting from the deflection of the upper end of the probe.

In the embodiment of the invention illustrated by Fig. 5 of the drawing, the probe 12 has its lower end attached to the reentrant portion 13 of the wave guide 10 and has its upper end extending centrally through the opening 11 in the upper wall of the guide. The microphone diaphragm 18 is connected to the metal disc or strip 19 which is spaced from the probe and extends parallel thereto. As the microphone diaphragm is vibrated by sound waves, the spacing between the strip 19 and the probe is varied and the capacity between them is correspondingly varied. The strip 19 is electrically grounded to the wave guide through the connection 20. The capacity between the wave guide and the probe is therefore varied in accordance with the vibrations of the diaphragm, and the signal transmitted along the guide is modulated.

The embodiment of the invention illustrated by Fig. 6 of the drawing is similar to that described in the foregoing in connection with Fig. 5, except that the probe 12 is of spring metal and has its upper end attached to the diaphragm 18 of a microphone, and the upper end of the probe is deflected from its normal central position in the opening 11 in accordance with vibrations of the diaphragm. This results in corresponding variations in the capacity between the probe and the wave guide and the modulation of a signal passing along the wave guide.

In the embodiment of the invention illustrated by Fig. 7 of the drawing, the probe 12 in the wave guide 10 has the disc 22 placed along its outer end and which is spaced from the disc 23 which is attached to the end of the piston 24 of the driving mechanism 25. The bolometer 26 is connected to the wave guide so as to respond to changes in the power level of a signal flowing along the wave guide, and is connected to form an arm of the conventional bridge circuit 27, the opposite arm of which is adjusted to balance the circuit when the power in the wave guide is at the desired level. The output of the bridge circuit is proportional in amplitude, and significant to changes in the power level coincident upon the bolometer. The output of the bridge circuit is amplified by the amplifier 28 and supplied into the driving mechanism 25 which, upon an increase in power in the wave guide above the desired level, moves the disc 23 nearer the disc 22. The wave guide is electrically connected to the driving mechanism 25 through the connection 30 so that as the disc 23 is moved nearer the disc 22, the capacity between the probe and the wave guide is increased thereby decreasing the power to the desired level.

The embodiment of the invention illustrated by Fig. 8 of the drawing is similar to that described in the foregoing in connection with Fig. 7 except that the probe 12 is of flexible spring metal, and its outer end is connected to the outer end of the piston 24 of the driving mechanism 25 so that an increase in power in the wave guide 10 above the desired level will result in the outer end of the probe being deflected nearer an edge of the opening 11 through which is extends, resulting in an increase in capacity between the probe and the wave guide, and in attentuation of the power in the wave guide.

We claim as our invention:

1. In combination, a wave guide having an opening in one of its sides, a probe having one end attached to the opposite side of the wave guide and having its other end extending through the opening beyond said one side, and means external the wave guide for varying the capacity between the probe and the wave guide, for varying the power in a signal passing along the wave guide.

2. In combination, a wave guide having an opening in one of its sides, a probe having one end attached to the opposite side of the wave guide and having its other end extending through the opening beyond said one side, a conductor connected to the wave guide and spaced from the probe, and means for varying the spacing of the conductor from the probe for varying the power in a signal passing along the wave guide.

3. In combination, a wave guide having an opening in one of its sides, a probe having one end attached to the opposite side of the wave guide and having its other end extending through the opening beyond said one side, and means for deflecting said other end of the probe for varying the capacity between same and the wave guide and thereby varying the power in a signal passing along the wave guide.

4. In combination, a wave guide having an opening in one of its sides, a probe having one end attached to the opposite side of the wave guide and having its other end extending through the opening beyond said one side, and means external the wave guide for modulating a signal passing therealong, said means including means for varying the capacity between the probe and the wave guide.

5. In combination, a wave guide having an opening in one side, a probe having one end attached to the opposite side of the wave guide and having its other end extending through the opening beyond said one side, means external the wave guide for varying the capacity between same and the probe, and means for vibrating said means at the frequencies of a modulating signal for modulating a signal passing along the wave guide.

6. In combination, a wave guide having an opening in one side, a probe having one end attached to the opposite side of the wave guide and having its other end extending through the opening beyond said one side, means external the wave guide for varying the capacity between same and the probe, means adapted to be vibrated by a modulating signal, and means for vibrating said first mentioned means by said last mentioned means for modulating a signal passing along the wave guide.

7. In combination, a wave guide having an opening in one side, a probe having one end attached to the opposite side of the wave guide and having its other end extending through the opening beyond said one side, a conductor spaced from the probe and connected to the wave guide, and means for vibrating said conductor for modulating a signal passing along the wave guide.

8. In combination, a wave guide having an opening in one side, a probe having one end attached to the opposite side of the wave guide and having its other end extending through the opening beyond said one side, a conductor spaced from the probe and connected to the wave guide, means adapted to be vibrated by a modulating signal, and means for vibrating said conductor by said means for modulating a signal passing along the wave guide.

9. In combination, a wave guide having an opening in one side, a probe having one end attached to the opposite side of the wave guide and having its other end extending through the opening beyond said one side, and means for vibrating said other end of said probe for modulating a signal passing along the wave guide.

10. In combination, a wave guide having an opening in one side, a probe having one end attached to the opposite side of the wave guide and having its other end extending through the opening beyond said one side, means adapted to be vibrated by a modulating signal, and means for vibrating said other end of said probe with said means for modulating a signal passing along the wave guide.

11. In combination, a wave guide having an opening in one side, a probe having one end attached to the opposite side of the wave guide and having its other end extending through said opening beyond said one side, means for varying the capacity between the probe and the wave guide, and means responsive to changes in the strength of a signal passing along the wave guide for adjusting said capacity varying means.

12. In combination, a wave guide having an opening in one side, a probe having one end attached to the opposite side of the wave guide and having its other end extending through the opening beyond said one side, a conductor connected to the wave guide and spaced from the probe, and means responsive to changes in the strength of a signal passing along the wave guide for moving said conductor towards said probe upon an increase in the strength of a signal within the guide.

13. In combination, a wave guide having an opening in one side, a probe having one end attached to the opposite side of the wave guide and having its other end extending through the opening beyond said one side, and means responsive to changes in the strength of a signal passing along the wave guide for the strength of a signal passing along the wave guide for deflecting said other end of the probe towards an edge of the opening upon an increase in signal strength above the desired level.

14. The invention as claimed in claim 1 in which the wave guide is a ridged wave guide, and the probe is attached to the reentrant portion thereof.

15. The invention as claimed in claim 2 in which the wave guide is a ridged wave guide, and the probe is attached to the reentrant portion thereof.

16. The invention as claimed in claim 3 in which the wave guide is a ridged wave guide, and the probe is attached to the reentrant portion thereof.

17. The invention as claimed in claim 4 in which the wave guide is a ridged wave guide, and the probe is attached to the reentrant portion thereof.

18. The invention claimed in claim 5 in which the wave guide is a ridged wave guide, and the probe is attached to the reentrant portion thereof.

19. The invention claimed in claim 11 in which the wave guide is a ridged wave guide, and the probe is attached to the reentrant portion thereof.

References Cited in the file of this patent

UNITED STATES PATENTS

| Number | Name | Date |
|---|---|---|
| 2,206,683 | Wolff | July 2, 1940 |
| 2,442,614 | Norton | June 1, 1948 |
| 2,454,042 | Dettinger | Nov. 16, 1948 |
| 2,457,601 | Ring | Dec. 28, 1948 |
| 2,461,005 | Southworth | Feb. 8, 1949 |
| 2,474,688 | Pease | June 28, 1949 |
| 2,481,993 | Fuss | Sept. 13, 1949 |
| 2,483,818 | Evans | Oct. 4, 1949 |
| 2,491,644 | Carlson | Dec. 20, 1949 |
| 2,491,669 | Larson | Dec. 20, 1949 |
| 2,542,182 | Crump | Feb. 20, 1951 |
| 2,577,146 | Norton | Dec. 4, 1951 |

OTHER REFERENCES

Publication I, "Microwave Transmission Circuits," edited by Ragan, vol. 9 of The Radiation Laboratory Series, published by McGraw-Hill May 21, 1948; pp. 359 and 360 relied on. Copy in Division 69.